Feb. 28, 1933. W. H. SHORTELL 1,899,212
HACK SAW BLADE
Filed Aug. 22, 1931
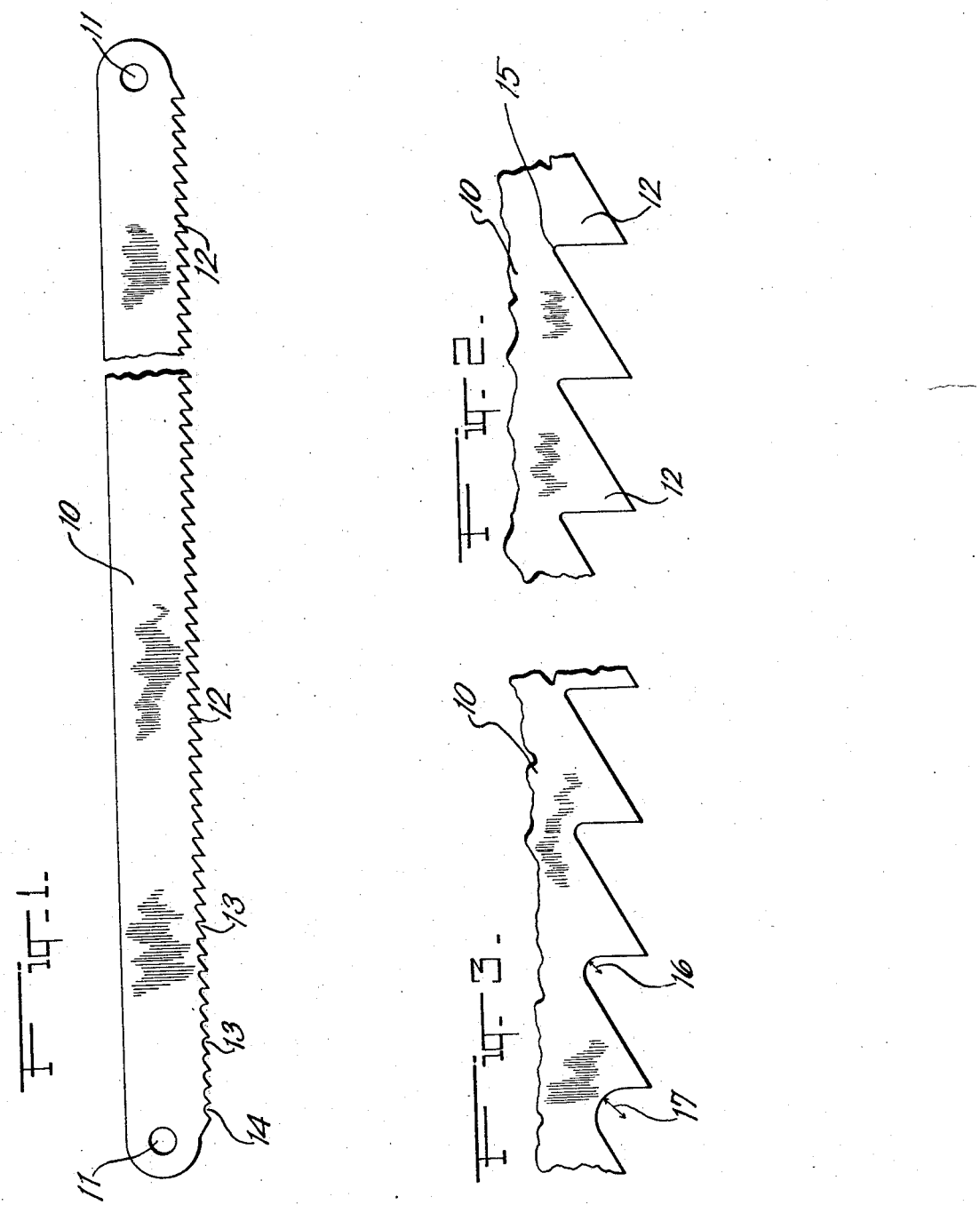
INVENTOR
William H. Shortell
BY
Harfield, Fraser & Brown
ATTORNEY Patented Feb. 28, 1933

1,899,212

UNITED STATES PATENT OFFICE

WILLIAM H. SHORTELL, OF GREENFIELD, MASSACHUSETTS, ASSIGNOR TO MILLS FALLS COMPANY, OF GREENFIELD, MASSACHUSETTS, A CORPORATION OF MASSACHUSETTS

HACK SAW BLADE

Application filed August 22, 1931. Serial No. 558,732.

This invention relates to improvements in saw blades and more particularly to improved hack saw blades, wherein the entering end of the blade, i. e., the end, which is first brought into contact with the work, is provided with teeth so constructed as to resist breakage even under the severest strains to which they are normally subjected.

An object of the invention is to provide a saw having teeth of equal pitch, i. e., angle of inclination or rake, throughout but provided at its entering end with a series of teeth of great strength adapted to resist breakage when brought into contact with the work.

A further object of the invention is to provide a saw blade having teeth of equal chip clearance throughout but provided at its entering end with a series of teeth of gradually diminishing depth, adapted normally to engage the work without breaking. The term "chip clearance", or "chip clearance opening" as used herein shall be understood as meaning the distance between the back of one tooth on the blade and the cutting edge of the next succeeding tooth thereon. The "chip clearance" as used herein is one dimension of the space between succeeding teeth, the other dimension being defined herein by the term "depth" or "tooth depth".

Further objects of the invention will in part be obvious and will in part appear hereinafter.

The invention accordingly comprises an article of manufacture possessing the features, properties and the relation of elements which will be exemplified in the article hereinafter described and the scope of the application of which will be indicated in the claims.

For a fuller understanding of the nature and objects of the invention, reference should be had to the following detailed description taken in connection with the accompanying drawing, in which:

Fig. 1 is a side view of a saw blade embodying my invention;

Fig. 2 is an enlarged fragmentary side view, showing a portion of the teeth representative of the great majority of teeth on the blade; and Fig. 3 is a view similar to Fig. 2, showing a portion of the series of teeth with which the entering end of the blade is provided.

Saw blades are ordinarily provided with relatively coarse teeth in order to expedite the cutting. The softer the stock to be cut, the coarser the teeth are made. It has been found that where saw teeth are made as large and coarse as the type of work requires, there is very considerable danger of breakage when the teeth are first brought into contact with the work, for the large, coarse teeth do not have sufficient strength to resist the sudden strain placed upon them.

Various attempts have been made to remedy this situation and saw blades have been developed with a relatively short series of teeth of different character from the teeth found on the main part of the blade, with the intent that these modified teeth shall first be brought into contact with the work, and the initial strain of that contact absorbed by teeth specifically designed to overcome it.

For example, a series of file-like teeth, strong, but very fine, has been suggested for use on the entering end of the blade. Such a blade, however, possesses certain distinct disadvantages. The fine teeth tend to clog with chips and the general efficiency of the blade is lower.

It has been also suggested that a series of teeth be provided at the entering end of the blade which have the same pitch as the main body of teeth on the blade, but which are provided with a relatively heavy backing so that a series of broad teeth with narrow chip clearance openings is provided. Teeth of this kind are stronger, at all points except the base, than the teeth on the main part of the saw, but it has been found that breakage usually takes place at the base of the teeth and hence, the disadvantage and loss of efficiency incident to the narrowing of the chip clearance openings, is not compensated for by the slight improvement in strength secured.

Other modified blades have been suggested but they all possess certain disadvantages which impair the efficiency of the blade.

My improved saw blade, while possessing the feature of added strength in the entering series of teeth, which has been so long desired, also substantially eliminates the disadvantages possessed by other blades. In my improved saw blade construction, the teeth are of equal pitch throughout and of equal chip clearance opening. Added strength is given to the teeth at the entering end of the blade by gradually diminishing the depth of the tooth as the entering end of the blade is reached. In this way, the teeth are made progressively stronger toward the entering end of the blade, so that the first tooth, i. e., the one most likely to come first into contact with the work, is strongest, and the teeth behind it on the blade progressively weaker until a certain predetermined tooth depth is reached, after which the remainder of the teeth are of equal strength.

In the accompanying drawing, 10 represents a saw blade provided with the usual openings, 11, at its ends, for adjustment to a hack saw frame. The blade is provided throughout the greater portion of its length with a series of teeth, 12, of uniform size and shape, shown in detail in Fig. 2.

In advance of this series of teeth and at the entering end of the blade, a series of teeth, 13, is provided. These teeth, some of which are shown in detail in Fig. 3, differ from the main body of teeth on the blade only in that the tooth depth of the teeth 13 is gradually decreased from the standard tooth depth of the teeth 12, to a minimum on the entering tooth, as at 14.

The saw teeth are made so that the back of one tooth makes contact with the face of the next succeeding tooth through an arc, as shown for example at 15. The difference between the apex of this arc and the point of the tooth represents the tooth depth. If the radius of the circle forming the arc 15 is slightly increased, as shown for example in Fig. 3 at 16 and 17, and the arc itself enlarged, the tooth depth will be gradually decreased without affecting the pitch, the tooth angle or the chip clearance opening. As the tooth depth is decreased, the teeth become progressively stronger, shorter and more sturdy. The added strength is embodied at the base where it is most needed. By increasing the size of the arc 15, the tooth depth can be decreased to any point desired without affecting the other characteristics of the tooth. A saw blade provided at its entering end with a series of teeth formed in this manner is efficient, strong and easy to manufacture. It stands up well under the strain of normal usage and possesses none of the disadvantages of other modified blade constructions.

While my improved blade is particularly designed for use in connection with a tool of the hack saw type, it may be used with equal effectiveness as an ordinary hand saw blade. In either case, it is intended that the sturdy teeth with shallow depth shall be first brought into contact with the work and that sufficient of these teeth shall be provided to smooth the work before the normally coarse teeth of the blade are brought into contact with it, so that there is little likelihood of breakage to any part of the blade.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which as a matter of language might be said to fall therebetween.

Having described my invention, what I claim as new and desire to secure by Letters Patent, is:

1. A saw blade provided with teeth, all having substantially the same pitch and chip clearance opening, a series of said teeth at its entering end having shallower depths than the remainder of the teeth.

2. A saw blade provided with teeth, all having substantially the same pitch and chip clearance opening, a group of said teeth having a substantially uniform depth, and the remainder of said teeth having progressively shallower depths than said first-mentioned group.

3. A saw blade provided with teeth, all having substantially the same pitch and chip clearance opening, a series of said teeth being of uniform strength, another series of said teeth, located at the enterng end of the blade, being progressively of less depth and stronger than the teeth in said first mentioned series.

4. A hack saw blade provided with teeth, all having substantially the same pitch and chip clearance opening, the teeth at its entering end being sufficiently shallow in depth to prevent breakage when brought into contact with the work.

5. A hack saw blade provided with teeth, all having substantially the same pitch and chip clearance opening, the tooth at the entering end of the blade having the shallowest depth, the teeth adjacent thereto having progressively greater depths until a maximum tooth depth is reached, the remainder of the teeth all having substantially the desired maximum tooth depth.

In testimony whereof I affix my signature.

WILLIAM H. SHORTELL.

CERTIFICATE OF CORRECTION.

Patent No. 1,899,212. February 28, 1933.

WILLIAM H. SHORTELL.

It is hereby certified that the name of the assignee in the above numbered patent was erroneously described and specified as "Mills Falls Company" whereas said name should have been described and specified as "Millers Falls Company," as shown by the records of assignments in this office; and that the said Letters Patent should be read with this correction therein that the same may conform to the record of the case in the Patent Office.

Signed and sealed this 25th day of April, A. D. 1933.

(Seal)

M. J. Moore,
Acting Commissioner of Patents.